United States Patent [19]

Silver

[11] E Re. 30,349

[45] Reissued Jul. 29, 1980

[54] EASY-OPENING CONTAINER WALL WITH CORELINE VENT

[75] Inventor: Francis M. Silver, Dayton, Ohio

[73] Assignee: Ermal C. Fraze, Dayton, Ohio

[21] Appl. No.: 10,660

[22] Filed: Jan. 2, 1970

Related U.S. Patent Documents

Reissue of:

[64] Patent No.: 3,404,801
Issued: Oct. 8, 1968
Appl. No.: 632,630
Filed: Apr. 21, 1967

[51] Int. Cl.[2] ..... B65D 41/32

[52] U.S. Cl. ..... 220/271

[58] Field of Search ..... 220/265-273, 220/276; 222/541

[56] References Cited

U.S. PATENT DOCUMENTS

| | | | |
|---|---|---|---|
| 3,215,305 | 11/1965 | Frankenberg | 220/270 |
| 3,251,503 | 5/1966 | Bozek | 220/54 |
| 3,251,503 | 5/1966 | Bozek | 220/54 |
| 3,273,744 | 9/1966 | Fraze | 220/270 |
| 3,283,946 | 11/1966 | Stec | 220/271 |
| 3,301,432 | 1/1967 | Novak | 220/54 |
| 3,301,432 | 1/1967 | Novak | 220/54 |
| 3,322,296 | 5/1967 | Khoury | 220/54 |
| 3,322,296 | 5/1967 | Khoury | 220/54 |
| 3,366,270 | 1/1968 | Khoury | 220/270 |
| 3,381,848 | 5/1968 | Brown | 220/273 |
| 3,450,300 | 6/1969 | Saunders | 220/271 |

*Primary Examiner*—George T. Hall
*Attorney, Agent, or Firm*—Smyth, Pavitt, Siegemund, Jones & Martella

[57] ABSTRACT

This disclosure describes an easy-opening container wall having a wall segment at least partially removable therefrom. A tab is secured to the container wall for initiating severance of the wall segment from the container wall. A rupturable scoreline is formed in the container wall adjacent the tab and rupturable in response to movement of the tab to initiate severance of the wall segment from the container wall.

56 Claims, 12 Drawing Figures

EASY-OPENING CONTAINER WALL WITH CORELINE VENT

Matter enclosed in heavy brackets [ ] appears in the original patent but forms no part of this reissue specification; matter printed in italics indicates the additions made by reissue.

BACKGROUND OF THE INVENTION

An easy-opening container wall of the full panel pullout type has a panel removable from the container wall and a tab secured to the panel to effect the removal thereof. Often, the removable panel covers a very large portion of the container wall. This type of easy-opening container wall usually employs a front opening tab, i.e., a tab of the type in which the forward end or nose engages the container wall adjacent an edge of the removable panel to initiate severance of the panel from the container wall.

More particularly, easy-opening container walls of this type typically include a rupturable scoreline in the container wall defining the removable panel, a tab having a handle portion and a rupturing portion, and a rivet integral with the panel for securing the tab to the removable panel. The rupturing portion of the tab is at the forward or nose end of the tab and lies closely adjacent the rupturable scoreline.

In operation of this device, the handle portion of the tab is moved away from the removable panel to force the rupturing portion of the tab against the rupturable scoreline or against the removable panel closely adjacent the scoreline. As the tab is secured to the removable panel by the rivet, such upward movement of the handle portion thereof tends to flex the removable panel adjacent the rivet. As the upward movement of the handle portion continues, it eventually becomes necessary for a section or paddle of the panel to bend about a bend line to allow for full upward movement of the handle portion of the tab. With a longitudinally rigid tab the bend line forms intermediate the rivet and the center of the container wall. A problem arises in this connection in that it is relatively hard to bend such a large section of the panel about the bend line. Furthermore, large paddles are generally undesirable in that they disturb the product within the container.

In an attempt to make easy-opening container walls of this type more easily opened, it has been suggested to form a lance in the tab. The tab is then riveted to the container wall through the lanced portion thereof. This lancing of the tab provides the tab with a built-in bend line and reduces paddle size; however, it does not obviate the need for forming a bend line fully across the section of the removable panel. Furthermore, the lancing of the tab further complicates the tab construction and makes the tab subject to failure from tearing and otherwise.

It is often necessary or desirable to form a vent opening in an easy-opening container wall before the initial severance of the panel from the container wall. Such vents may be desirable where the product within the container is under pressure or vacuum and it is desirable to release or admit pressure prior to beginning removal of the panel.

Heretofore, such vent openings have been formed only with rear opening tabs, i.e., those tabs that are secured to a tear strip intermediate the ends of the tab and such intermediate portion of the tab lifts the leading edge of the tear strip to initiate severance thereof. One such device includes a complicated hinged tab arrangement secured to a tear strip in a container wall by a first rivet. The tab is further secured to the container wall by a vent rivet which is spaced from the first rivet and lies outside of the tear strip. When the tab is manipulated to open the container, the vent rivet is removed by a shearing action before the tab is operative to remove the tear strip from the container wall. This arrangement is fraught with disadvantages among which are the complexity of the tab, the need for a second rivet, and the additional force required to remove the vent rivet by a shearing action. Furthermore, this prior art device would not be suited for use with a front opening tab.

SUMMARY OF THE INVENTION

The present invention provides an easy-opening container wall having a vent opening therein which is particularly adapted for use with a front opening tab and can conveniently be used in full panel pullouts. Furthermore, the present invention facilitates initial severance of the removable panel from the container wall and more particularly, the vent opening itself makes initial severance of the panel from the container wall easier. The invention eliminates the need for lancing of the tab and, therefore, simplifies tab construction and eliminates the danger of tab failure that is ever present with lanced tabs.

The concepts of the present invention are particularly applicable to an easy-opening container wall of the type having a rupturable scoreline defining a wall segment or panel in the container wall at least partially removable therefrom and a tab having a handle portion and a rupture portion. The tab is secured to the wall segment intermediate the handle portion and rupturing portion by a rivet or other suitable interconnecting means.

With an easy-opening container wall of the type described above, the present invention teaches providing a rupturable vent scoreline in the wall segment closely adjacent the rivet, with the rivet lying between the rupturing portion of the tab and a least a portion of the rupturable vent scoreline. This vent scoreline accomplishes two very important functions. First, when the handle portion of the tab is moved away from the wall segment, the portion of the wall segment immediately surrounding the rivet is flexed upwardly to rupture the vent scoreline. This provides a relatively small vent opening or aperture in the wall segment through which gases within the container may escape. The vent opening is formed prior to the time that the rupturing portion of the tab ruptures the rupturable scoreline to initiate severance of the wall segment from the container wall.

A second very important function of the vent scoreline is to facilitate continued movement of the handle portion of the tab away from the wall segment to initiate severance of he wall segment. Rupturing o the vent scoreline renders the adjacent portion of the panel more flexible so that the panel generally offers considerably less resistance to upward movement of the tab. In addition, as the handle portion of the tab is raised further, a bend line in the form of two bend line segments forms in the wall segment. The bend line segments extend generally laterally from the ends of the vent scoreline, respectively, toward the rupturable scoreline. Thus, with the present invention, the rupturable vent scoreline effectively shortens the length of the bend line that must be formed in the wall segment as no bend line is formed intermediate the ends of the vent scoreline. This further facilitates upward movement of the tab. Finally, the location of the fulcrum about which the tab pivots can be moved closer to the rupturing portion of the tab by appropriately shaping the vent scoreline to increase the mechanical advantage and further facilitate ease of opening.

An important feature of the present invention is that the tab can be entirely longitudinally rigid and there is no need for lancing of the tab. With the present invention, the longitudinally rigid tab acts first as a rear opening tab to rupture the vent scoreline and secondly as a front opening tab to initiate severance of the panel from the container wall. During the second phase of tab movement, the vent scoreline is operative to cause the bend line segments in the container wall to function as an easily operable hinge to facilitate continued swinging action of the tab. Accordingly, it may be desirable to embody the present invention in an easy-opening container wall merely to facilitate manipulation of the tab even though there is no need for equalizing inside and outside of the container.

Various shapes of vent scoreline may be used. For example, a generally trough-shaped scoreline which may be either generally U-shaped or V-shaped can be very satisfactorily used. In this instance, the trough preferably opens toward the rupturing portion of the tab.

Use of the rupturable vent scoreline introduces the possibility that once the metal of the wall segment begins tearing along the vent scoreline, it will continue tearing beyond the ends of the vent scoreline. To obviate this potential problem, it is preferred to utilize barrier dimples closely adjacent the end portions of the vent scoreline. Preferably, such barrier dimples are elongated and the longitudinal axis of such dimples lies generally perpendicular to the adjacent length of the vent scoreline.

One feature of the present invention is to positively preclude tearing of the metal of the wall segment beyond the end of the vent scoreline by utilizing an elongated barrier dimple which is crimped toward an end portion of the vent scoreline. The crimp in the barrier dimple makes is virtually impossible for the metal thereof to be torn during any reasonable usage of the container wall. The elongation of the barrier dimples makes it very difficult or impossible for the metal of the wall segment to tear laterally around the dimple.

Another feature of the present invention is to turn or curve the end portions of the vent scoreline away from the rupturing portion of the tab. This reduces the tendency of the metal of the wall segment to continue tearing beyond the end portions of the vent scoreline.

The present invention also teaches varying the shape and length of the vent scoreline to control the location of the bend line in the removable panel. Further, by appropriately locating the barrier dimples, the barrier dimples will not lie along the bend line and therefore will not offer any resistance to bending about the bend line.

The invention, both as to its organization and method of operation, together with further features and advantages thereof, may best be understood by reference to the following description taken in connection with the accompanying drawings.

DESCRIPTION OF THE PREFERRED EMBODIMENT

Figure 1:
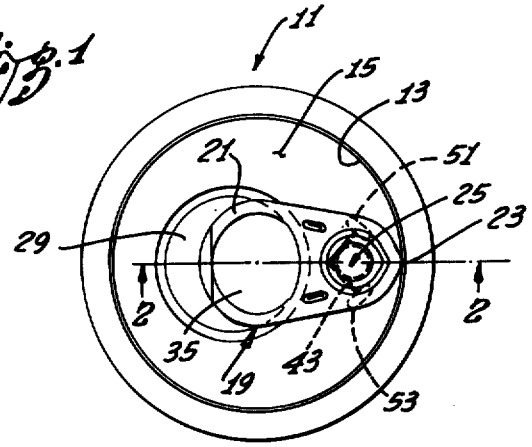
FIG. 1 is a top plan view of an easy-opening container wall constructed in accordance with the teachings of the present invention.
Figure 2:
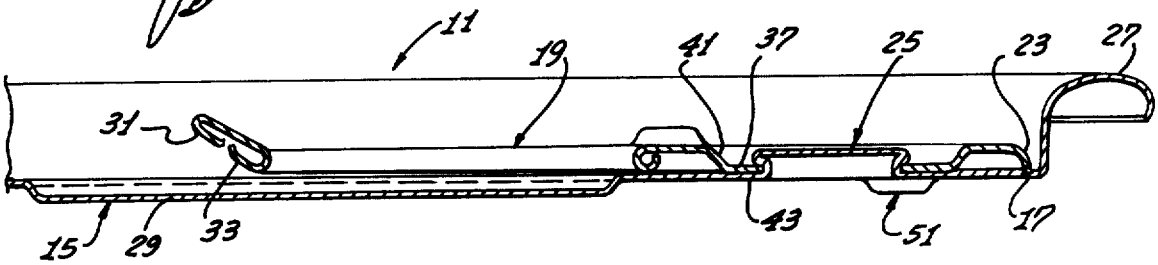
FIG. 2 is an enlarged fragmentary sectional view taken along line 2—2 of FIG. 1.

Referring to the drawings and in particular to FIG. 1 thereof, reference numeral 11 designates an easy-opening container wall or can end constructed in accordance with the teachings of the present invention. The container wall 11 is formed of sheet metal and has a circular rupturable scoreline 13 therein which defines a wall segment or removable panel 15. The panel 15 is removable from the container wall 11 by tearing of a rupturable web 17 (FIG. 2) which is defined by the rupturable scoreline 13. The panel 15 can be removed from the container wall 11 by a front opening tab 19 having a handle portion 21 and a rupturing portion 23. The tab 19 is attached to the panel 15 by a hollow rivet 25 formed integrally with the panel 15. As shown in FIGS. 1 and 2, the rivet 25 lies intermediate the handle portion 21 and the rupturing portion 23 and the rupturing portion 23 lies along or closely adjacent the scoreline 13.

Figure 6:
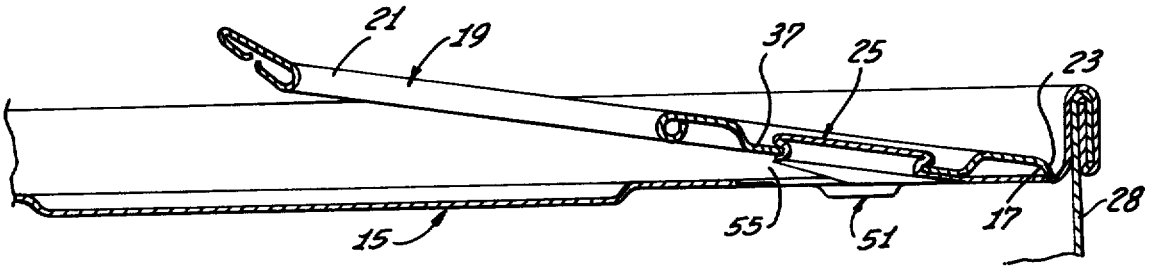
FIG. 6 is an enlarged fragmentary sectional view similar to FIG. 2 after the tab has been raised slightly to rupture the vent scoreline.
Figure 7:
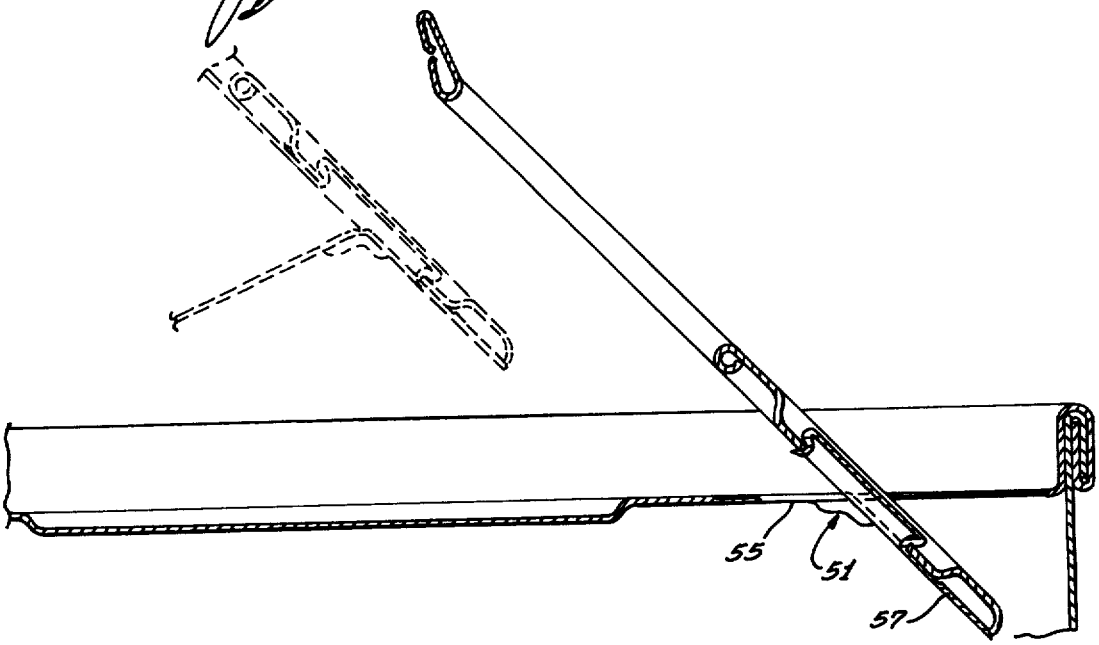
FIG. 7 is an enlarged fragmentary sectional view similar to FIG. 6 showing how continued manipulation of the tab effects removal of the wall segment from the container wall.

With reference to FIG. 2, the can end 11 has a peripheral flange 27 for attaching the container wall 11 to a container 28 (FIGS. 6 and 7). The panel 15 is formed with an inwardly dished section 29 beneath the handle portion 21.

The tab 19 is a longitudinally rigid member which is stiffened by an outer bead 31 extending a substantial distance around the periphery of the tab and an inner bead 33 which defines a finger opening or ring 35. The tab also has a lower wall 37 having an aperture 39 therein. The lower wall 37 is integrally connected to the remaining portion of the tab 19 by an upwardly extending sloping wall 41. As shown in FIG. 2, the rivet 25 projects through the aperture 39 to clamp the tab 19 firmly against the panel 15. The tab 19 forms a longitudinally rigid lever and has no lance in the lower wall 37 thereof. The rupturing portion 23 of the tab is in the form of a depending flange and preferably lies above the rupturable web 17 as shown in FIG. 2.

Figure 3:
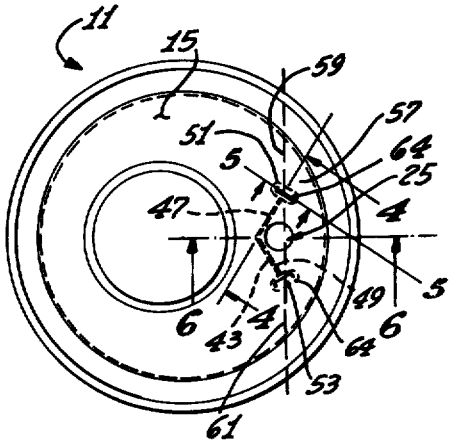
FIG. 3 is a bottom plan view of the easy-open container wall of FIG. 1.

With reference to FIG. 3, a rupturable vent scoreline 43 of a shallow V configuration is formed in the panel 15. The vent scoreline 43 opens toward the rupturing portion 23 of the tab 19 and partially surrounds the rivet 25, with the rivet 25 lying intermediate the rupturing portion of the tab and the vent scoreline. The rivet 25 lies at least partially within a region of the panel 15 which is partially enclosed by the vent scoreline 43. The vent scoreline 43 is scored downwardly to leave a residual vent web 45 (FIG. 4) of only approximately .003 inch. Typically, the vent web 45 will be at least slightly thinner than the rupturable web 17. The vent scoreline 43 illustrated in FIG. 3 is symmetrical about a radially extending line drawn through the center of the container wall 11 and through the apex of the V-shaped scoreline.

The vent scoreline has two end portions 47 and 49. Elongated identical barrier dimples 51 and 53 are formed closely adjacent the end portions 47 and 49, respectively. As shown in FIG. 3, the longitudinal axis of each of the barrier dimples 51 and 53 is generally perpendicular to the adjacent leg of the V-shaped vent scoreline 43.

Figure 4:
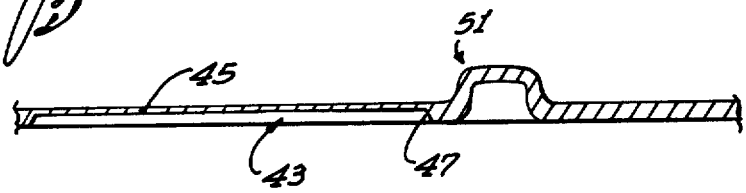
FIG. 4 is an enlarged fragmentary sectional view taken along line 4—4 of FIG. 3 and illustrating one of the barrier dimples.
Figure 5:
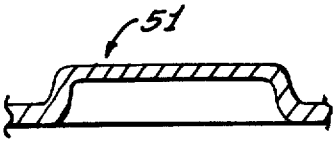
FIG. 5 is an enlarged fragmentary sectional view taken along line 5—5 of FIG. 3 and illustrating the barrier dimple.

The details of the barrier dimple 51 can best be seen by reference to FIGS. 4 and 5. The barrier dimples 51 and 53 are preferably formed downwardly so as not to interfere with the tab 19 which lies thereover. The dimples 51 and 53 should be elongated so as to make it difficult for the metal of the can end 11 to tear around the dimple. In the particular embodiment illustrated, the dimple 51 is longer (FIG. 5) than it is wide (FIG. 4) and is located very closely adjacent the outer end portion 47 of the vent scoreline 43.

The operation of the present invention can best be understood by reference to FIGS. 6 and 7. The user first grasps the handle portion 21 of the tab 19 and lifts it upwardly away from the panel 15. Such upward movement of the handle portion 21 flexes the panel 15 adjacent the rivet 25 and applies an upward force through the lower wall 37 to the edge of the rivet 25 adjacent the handle portion 21. Simultaneously, the rupturing portion 23 of the tab 19 is urged downwardly toward the web 17 surrounding the panel 15. As such upward movement of the handle portion 21 continues, the panel 15 will deflect somewhat and when sufficient force is applied to the vent scoreline 43, the vent web 45 will rupture to form a vent opening or aperture 55 (FIG. 6). The vent opening 55 which is formed before the web 17 ruptures, allows for the escape of gases within the container and makes the panel 15 adjacent the rivet 25 more flexible to facilitate continued upward movement of the handle portion 21.

To allow for further upward movement of the handle portion 21, it is necessary that the panel 15 bend to allow a panel section 57 (FIGS. 3 and 7) to bend inwardly into the interior of the container. It has been found that the panel section 57 tends to bend about aligned bend line segments 59 and 61 (FIG. 3) and that the tab pivots about such bend line segments. As shown in FIG. 3, the bend line segments 59 and 61 extend generally laterally from the end portions 47 and 49, respectively, of the vent scoreline 43. Thus, the location of the end portions 47 and 49 generally control the location of the bend line segments 59 and 61 and the leverage obtainable from a tab of given length. In the embodiment illustrated, the bend line segments 59 and 61 may extend around or through the barrier dimples 51 and 53. The bend line segments 59 and 61 combined form a bend line about which the panel section 57 pivots inwardly as shown in FIG. 7. It will be appreciated that without the vent scoreline 43 and the rupturing thereof, the bend line formed in the panel 15 would necessarily have to extend completely across such panel intermediate the rivet 27 and the handle portion 21. However, because of the rupture of the vent scoreline 43, it is only necessary to bend the metal along the two relatively short bend line segments 59 and 61. This materially facilitates continued upward movement of the handle portion 21.

The rupturing portion 23 of the tab 19 forcibly engages and ruptures the web 17 to form an opening 63 (FIG. 7) in the can end 11. As a result of the pivoting of the tab 19 and the panel section 57 about the bend line segments 59 and 61, the web 17 will rupture along its length generally between the ends of the bend line segments 59 and 61. To effect enlargement of the opening 63, it is necessary for the user to exert an upward and outward pull along the tab 19 as shown in phantom in FIG. 7. This will cause further rupture of the web 17 and ultimately complete removal of the panel 15 from the container 28.

The barrier dimples 51 and 53 prevent tearing of the metal of the panel 15 during raising of the tab 19. If the dimples 51 and 53 were not provided, the metal of the panel 15 would tend to tear beyond the end portions 47 and 49 of the vent scoreline 43. Such tearing might occur, for example, generally along tear lines 64 (FIG. 3).

Figure 8:
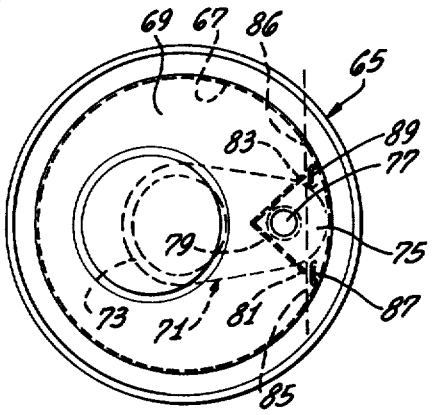
FIG. 8 is a bottom plan view of a container wall embodying a second form of vent scoreline.

FIG. 8 illustrates a second embodiment of the device. The embodiment of FIG. 8 is identical to the embodiment of FIGS. 1–7 except the shape of the vent scoreline and the position of the barrier dimples have been changed. Thus, FIG. 8 shows a container wall 65 having a rupturable scoreline 67 defining a removable panel 69. A tab 71 having a handle portion 73 and a rupturing portion 75 is secured to the panel 69 by a rivet 77. In all of the respects mentioned above, the structure of FIG. 8 is identical to the structure of FIGS. 1–7.

A generally V-shaped vent scoreline 79 is formed in the panel 69. The vent scoreline 79 extends generally toward the rupturing portion 75 of the tab 71 and terminates in end portions 81 and 83. If a straight line were drawn between the end portions 81 and 83, it would lie intermediate the rivet 77 and the rupturing portion 75. Bend line segments 85 and 86 which are generally aligned extend laterally outwardly of the end portions 81 and 83, respectively.

Elongated barrier dimples 87 and 89 are formed closely adjacent the end portions 81 and 83, respectively, of the vent scoreline 79. The longitudinal axis of the elongated barrier dimples 87 and 89 are generally transverse to the end portions 81 and 83 but are not perpendicular thereto. The longitudinal axes of the barrier dimples 87 and 89 are generally parallel to the bend line segments 85 and 86.

The operation of the embodiment of FIG. 8 is the same as the operation of the embodiment of FIGS. 1–7. It should be noted, however, that end portions 81 and 83 of the vent scoreline 79 terminate closer to the rupturable scoreline 67 than do the end portions 47 and 49 of the vent scoreline 43. Thus, in the embodiment of FIG. 8 the bend line segments 85 and 86 are shorter than the corresponding bend line segments in the embodiment of FIGS. 1–7 and greater leverage is obtainable with the tab 71. Furthermore, the dimples are oriented so as not to lie along the bend line segments 85 and 86 and, therefore, the dimples cannot interfere with the formation of the bend line segments. Accordingly, the embodiment of FIG. 8 will be somewhat easier to open than the embodiment of FIGS. 1-7.

Figure 9:
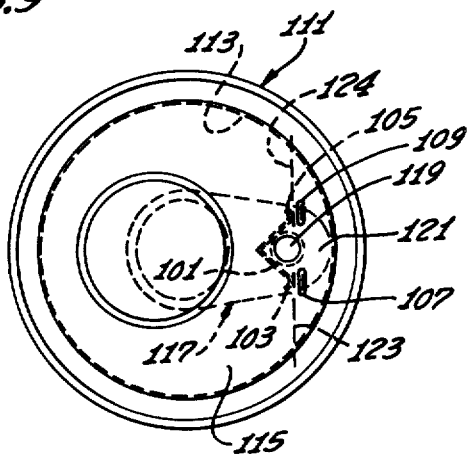
FIG. 9 is a bottom plan view of a container wall embodying a third form of vent scoreline.

FIG. 9 shows a third embodiment of the invention. The embodiment of FIG. 9 is very similar to the embodiments described above except that the former teaches the use of a vent scoreline 101 having end portions 103 and 105 which curve away from the associated barrier dimples 107 and 109. The curving of the end portions 103 and 105 tends to further reduce the likelihood of tearing of the metal of the can end.

More specifically, FIG. 9 shows a container wall 111 having a rupturable scoreline 113 defining a removable panel or wall segment 115. A tab 17 is secured to the wall segment 115 by a rivet 119. The vent scoreline 101 is formed in the panel 115 and opens toward a rupturing portion 121 of the tab 117.

The operation of the embodiment of FIG. 9 is the same as the operation of the embodiment of FIGS. 1-7. The elongated barrier dimples 107 and 109 are located as described above in connection with the embodiment of FIG. 8 so as to lie on one side of bend line segments 123 and 124. The primary advantage of the embodiment of FIG. 9 is that the turning or curving of the end portions 103 and 105 away from the rupturing portion 121 of the tab 117 further reduces the tendency of the metal of the panel 115 to tear. This is so because the curved end portions 103 and 105 inherently offer more resistance to tearing of the sheet metal than does the straight line end portions shown in FIGS. 1 and 8.

Figure 10:
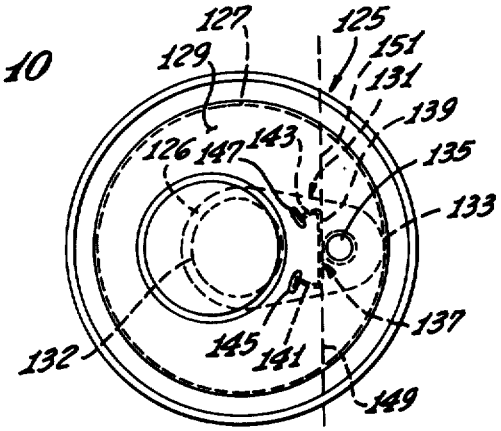
FIG. 10 is a bottom plan view of a container wall embodying a fourth form of vent scoreline.

FIG. 10 shows a fourth embodiment of the present invention. More particularly, FIG. 10 shows an alternate shape of vent scoreline and an alternate manner of turning of the end portions of the vent scoreline away from the rupturing portion of the tab.

FIG. 10 shows a container wall 125 having a circular rupturable scoreline 127 defining a removable panel 129. A tab 131 having a handle portion 132 and a rupturing portion 133 is secured to the panel 129 by a rivet 135.

A vent scoreline 137 is formed in the panel 129. The vent scoreline has an intermediate section 139 in the form of a straight line which lies closely adjacent the rivet 135 intermediate the rivet and the handle portion 132 of the tab 131. The vent scoreline 137 has end portions 141 and 143 which are turned away from the rupturing portion 133 of the tab 131. Barrier dimples 145 and 147 are formed closely adjacent the end portions 141 and 143, respectively, with the longitudinal axes of the barrier dimples being generally perpendicular to the adjacent end portion. The barrier dimples 145 and 147 prevent tearing of the metal of the panel 129 beyond the end portions 141 and 143.

In the operation of the embodiment of FIG. 10, bend line segments 149 and 151 will form in the can end as shown in FIG. 10 upon raising of the handle portion 132 of the tab 131. Generally, the bend line segments 149 and 151 and the intermediate section 139 will form a generally straight line. A vent opening will be formed by the rupture of the vent scoreline 137 and the panel 129 is removed as described above.

Figure 11:
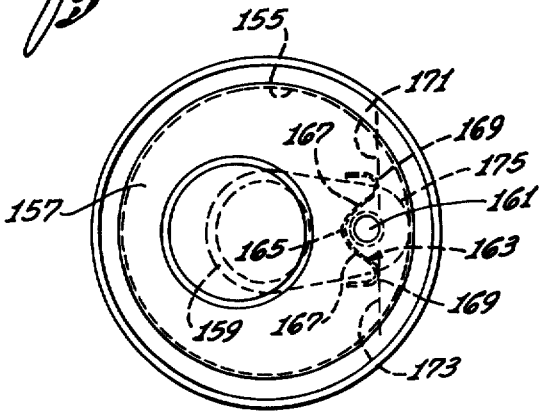
FIG. 11 is a bottom plan view of a container wall embodying a fifth form of vent scoreline.

FIG. 11 shows another form of vent scoreline. FIG. 11 illustrates a container wall or can end 153 having a circular rupturable scoreline 155 therein defining a circular removable panel 157. A tab 159 is secured to the panel 157 by a rivet 161 and is oriented with respect to the container wall 153 in the same manner as described above in connection with the embodiment of FIGS. 1-7. A vent scoreline 163 is formed part way around the rivet 161 as shown. The vent scoreline 163 is shaped similarly to the vent scoreline 101 shown in FIG. 9. The vent scoreline 163 has a curved portion 165 adjacent the rivet and tangent portions 167 extending outwardly therefrom toward the periphery of the panel 157. Each of the tangent portions 167 terminates in a curved end portion 169 which redirects the vent scoreline 163 back toward the central region of the panel 157. This substantially reduces the tendency of the panel 157 to continue tearing beyond the end portions of the vent scoreline upon rupture of the vent scoreline by the tab 159.

Manipulation of the tab 159 causes the panel 157 to bend about bendline segments 171 and 173 to define a paddle 175. The bendline segments 171 and 173 are generally aligned and extend generally tangent to the curved end portions 169. The tangent portions 167 should extend toward the periphery of the panel 157 a sufficient distance so that the paddle 157 will not be unduly large and yet be sufficiently large to provide from the rupture of a sufficiently long arcuate segment of the scoreline 155 in response to pivotal movement of the tab 159. The radius of the curved end portions 169 should be sufficiently large to avoid tearing of the panel 157 beyond the vent scoreline 163 upon manipulation of the tab 159 to initiate severance of the panel 157. No barrier dimples are provided in the embodiment shown in FIG. 11 although barrier dimples would be utilized, if desired.

Another feature of the present invention is to form an improved barrier dimple. Such improved barrier dimple is useful in preventing tearing of the sheet metal beyond the ends of a scoreline in sheet material.

Figure 12:
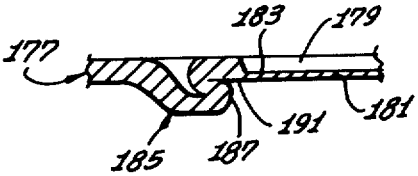
FIG. 12 is a fragmentary sectional view similar to FIG. 4 illustrating a modified form of barrier dimple.

More particularly, with reference to FIG. 12, reference numeral 177 designates a section of sheet metal. A rupturable scoreline 179 defines a rupturable web 181 in the sheet metal. The rupturable web 181 has an end portion 183 beyond which it is desired to prevent tearing of the sheet metal. To prevent such tearing, an elongated barrier dimple 185 is formed integrally in the sheet metal. The section through the barrier dimple 185 shown in FIG. 12 is taken generally transverse the longitudinal axis of the barrier dimple 185. The barrier dimple 185 is crimped over toward the end portion 183. Thus, a tip 187 of the barrier dimple 185 engages an undersurface 191 of the section of sheet metal 177. It has been found that this crimping of the barrier dimple toward the end portion of the rupturable web 181 substantially increases the ability of the barrier dimple to resist tearing of the sheet metal beyond the end portion 183.

It will be apparent that the barrier dimple 185 has utility in various areas of the sheet metal art where it is desired to prevent tearing of the sheet metal. One such use is described above in connection with the various embodiments shown in FIGS. 1-11.

The barrier dimple can be formed easily by merely forming a barrier dimple of the type shown in FIGS. 4 and 5 with a cooperating punch and die set (not shown) and then crimping of the metal laterally with any convenient tooling, such as a punch having a sloping working surface.

Although exemplary embodiments of the invention have been shown and described, it will be apparent that one having ordinary skill in the art could make numerous modifications, substitutions and changes without necessarily departing from the spirit and scope of the present invention.

I claim:

1. In an easy-opening container wall, the combination of:

a scoreline in the container wall defining a rupturable web in the container wall, said rupturable web defining a wall segment at least partially removable from the container wall;

a tab for initiating removal of said wall segment, said tab having a *longitudinally* handle portion and a rupturing portion;

interconnecting means for attaching said tab intermediate said portions thereof to the container wall with the rupturing portion lying closely adjacent said rupturable web and being engageable with said wall segment whereby movement of said handle portion of said *longitudinally* tab away from the container wall forces said rupturing portion toward the container wall *while said tab remains longitudinally rigid*; [and]

rupturable scoreline means in the container wall adjacent said interconnecting means rupturable in response to movement of the handle portion of the tab away from the container wall *while said tab remains longitudinally rigid* to form an aperture in the container wall to facilitate continued movement of said handle portion away from the container wall *while said tab remains longitudinally rigid* whereby such continued movement of the handle portion causes said rupturing portion to initiate severance of said wall segment from the container wall along said rupturable web[.]*; and*

*said longitudinally rigid tab remaining longitudinally rigid during rupture of both said scoreline and said rupturable scoreline means and during movement of the handle portion away from the container wall whereby the rupturing portion of said rigid tab bears downwardly on said container wall while lifting on said interconnecting means as said handle portion of said rigid tab is moved away from said container wall.*

2. A tab as defined in claim 1 wherein said interconnecting means is positioned between said rupturable web and at least a portion of said rupturable scoreline means prior to said movement of said handle portion of said tab away from the container wall.

3. A combination as defined in claim 1 wherein said rupturable scoreline means terminates in end portions and barrier dimple means are provided adjacent said end portions of said rupturable scoreline means to resist tearing of the material of the container wall beyond said rupturable scoreline means.

4. In an easy-opening container wall, the combination of:

a scoreline in the container wall defining a rupturable web in the container wall, said rupturable web defining a wall segment at least partially removable from the container wall;

a longitudinally rigid tab for initiating removal of the wall segment from the container wall, said tab having a lifting portion and a rupturing portion;

interconnecting means for attaching said tab intermediate said portions thereof to said wall segment with the rupturing portion lying closely adjacent said rupturable web whereby movement of said lifting portion of said tab away from the container wall forces said rupturing portion toward the container wall; and a line of weakness in said wall segment, said line of weakness having end portions spaced from said first rupturable web, said interconnecting means lying between at least a portion of said line of weakness and said rupturable web whereby movement of said handle portion of said tab away from the container wall stresses and ruptures the container wall along said line of weakness to provide an aperture in said wall segment to facilitate continued movement of said handle portion of said tab, such continued movement of the handle portion causing said rupturing portion to initiate severance of said wall segment from the container wall along said rupturable web.

5. A combination as defined in claim 4 wherein said line of weakness is generally trough-shaped and opens toward said rupturing portion of said tab.

6. A combination as defined in claim 4 wherein said end portions of said line of weakness are turned away from said rupturing portion of said tab.

[7. A combination as defined in claim 4 including a barrier dimple in the wall segment closely adjacent one of said end portions of the line of weakness with said barrier dimple being crimped over toward said one end portion.]

8. A combination as defined in claim 4 including an elongated barrier dimple with the longitudinal axis of said barrier dimple lying closely adjacent and being generally transverse to one of said end portions of said line of weakness.

9. In an easy-opening container wall of sheet metal, the combination of:

a scoreline in the container wall defining a panel at least partially removable therefrom;

a line of weakness adjacent one end of the panel and partially enclosing a region of the panel, said line of weakness terminating short of said scoreline;

a *longitudinally rigid* tab having a lifting end and a rupturing end; and a hollow rivet integral with said region of the panel and partially surrounded by said line of weakness, said rivet lying intermediate said line of weakness and said scoreline, said rivet attaching said tab to the panel intermediate said ends thereof with the rupturing end of the tab closely adjacent said one end of the panel whereby movement of said handle end of said tab away from the container wall *causes the rupturing end of said tab to bear downwardly against said container wall while said tab remains longitudinally rigid and* lifts said region of the panel *by the rupturing end bearing downwardly as the lifting end of said longitudinally rigid tab is lifted thus raising said longitudinally rigid tab intermediate the ends thereof* to cause said tab to rupture said line of weakness as a rear opening tab to form an opening in the panel and causes said rupturing portion to push said one end of said panel downwardly to initiate removal of the panel from the container wall in front opening fashion.

10. In a method of limiting tearing of sheet material beyond an end of a rupturable scoreline formed in the sheet material, the steps of:

forming a barrier dimple in the sheet material closely adjacent the end of the rupturable scoreline; and crimping said dimple toward said end of said rupturable scoreline to substantially prevent tearing of the sheet material beyond said end of the rupturable scoreline.

11. A method as defined in claim 10 wherein said barrier dimple is elongated with the longitudinal axis thereof being generally transverse to a portion of the rupturable scoreline adjacent said end of the rupturable scoreline.

12. A method as defined in claim 10 wherein the sheet material defines an easy-opening sheet metal can end having a hollow rivet integral therewith and the rupturable scoreline is formed at least partially around said hollow rivet.

13. In an easy-opening container wall of sheet material, the combination of:

a scoreline defining a rupturable web in the container wall, said rupturable web defining a wall segment at least partially removable from the container wall;

a longitudinally rigid tab for initiating removal of the wall segment from the container wall, said tab having a handle portion;

interconnecting means for attaching said tab to the container wall closely adjacent said rupturable web in position to rupture the container wall along the scoreline in response to moving of the handle portion away from the container wall; and a line of weakness in the container wall, said interconnecting means lying between at least a portion of said line of weakness and said scoreline, said container wall being rupturable along the line of weakness in response to movement of the handle portion away from the container wall to form an aperture in the container whereby continued movement of the handle portion away from the container wall is facilitated and causes rupture of the container wall along said scoreline.

*14. An end closure for a container, said end closure having a removable area defined by a score line adjacent to the periphery thereof, a rivet formed in said removable area, a longitudinally rigid pull tab secured intermediate the ends thereof to said removable area by said rivet and an ancillary score in said removable area, said ancillary score having a central portion adjacent to one side of said rivet, the ends of said ancillary score extending towards said peripheral score so that said longitudinally rigid pull tab may be manipulated by lifting one end thereof to cause the other end to bear downwardly on the end closure while the portion of the rigid tab intermediate the ends of said rigid tab lifts on said rivet to rupture said ancillary score and stress the metal between said scores to initiate rupture of said peripheral score.*

*15. The end closure defined in claim 14 wherein said central portion of said ancillary score encircles said rivet for a portion of the circumference of said rivet.*

*16. The end closure defined in claim 14 wherein said ends of said ancillary score are separated from said peripheral score by an inclined wall which slopes outwardly from said ancillary score.*

*17. A container component, said component having a primary score defining a removable section in said component, a longitudinally rigid opening tab, means connecting said opening tab to said removable section, and an ancillary score in said removable section adjacent said connecting means whereby when one end of said longitudinally rigid opening tab is pulled upwardly the other end of said tab adjacent said primary score and forward of said connecting means bears downwardly to lift upon said connecting means through the action of said rigid tab and to stress said connecting means relative to said removable section, said ancillary score will rupture to permit said connecting means to move out of the plane of said removable section to facilitate the application of rupturing pressure against said primary score.*

*18. A container end closure, said end closure having a primary peripheral score defining a removable section, a longitudinally rigid opening tab, a rivet connecting said opening tab to said removable section, said longitudinally rigid tab including means on one side of said rivet for applying pressure to said removable section immediately inwardly of said primary score to initiate rupture of said primary score, handle means on said opening tab disposed on the opposite side of said rivet, and an ancillary score disposed closely adjacent said rivet on said opposite side thereof, said ancillary score being rupturable through the action of said longitudinally rigid tab when said handle means is lifted to cause said means on one side of said rivet to bear down on said end closure forward of said rivet as said handle end of said tab is lifted to stress said rivet relative to said removable section, whereby said rivet is enabled to move out of the plane of said removable section to permit said pressure applying means to be moved by further manipulation of said handle means to effect initial rupture of said primary score.*

*19. Container easy-open structure comprising a container wall, an outer scoreline of diminished material thickness located on the container wall defining a removable portion of such wall, an inner scoreline of diminished material thickness located within the removable portion of the container wall, the scorelines defining a tear segment in the container wall located between the scorelines, a longitudinally rigid opening member including a forward end and an intermediate portion, and securing means for securing the opening member through said intermediate portion to the tear segment, the opening member including a handle end in spaced relationship from the securing means, the inner scoreline having a starter section at the tear segment adjacent the securing means at a position to be ruptured with movement of the handle end of the opening member in a direction away from the container wall, the outer scoreline having a starter section at the tear segment adjacent the securing means at a position to be ruptured with movement of the handle end of the opening member in a direction away from the container wall, the rupture of one of the starter sections being by Class 1 lever action of said longitudinally rigid opening member and the rupture of the other starter section being by Class 2 lever action of said longitudinally rigid opening member, the starter sections of the scorelines being located on opposite sides of the securing means so that the securing means is completely within the tear segment.*

*20. The structure of claim 19 in which the tear segment extends between the scorelines around a peripheral segment of the removable portion of the wall.*

*21. The structure of claim 19 in which the starter section of the inner scoreline adjacent the securing means includes a pointed configuration.*

*22. The structure of claim 21 in which the pointed configuration of the inner scoreline starter section projects in a direction away from the securing means.*

*23. The structure of claim 19 in which the tear segment has opposite ends and a midsection, and the opening member is secured to the midsection of the tear strip.*

*24. Container easy-open structure comprising a container wall, an outer scoreline of diminished material thickness defining a removable portion of the container wall, an inner scoreline of diminished material thickness*

*located within the removable portion of the container wall, the scorelines defining a tear segment extending between the scorelines around a peripheral segment of the removable portion of the wall, a longitudinally rigid opening member, and securing means for securing the opening member to the tear segment, the opening member having a handle end non-bendable during use and a remaining end non-bendable during use located on opposite sides of the securing means, the inner scoreline having a starter section located in close proximity to the securing means at a position to be ruptured by Class 2 lever action with movement of the handle end of the longitudinally rigid opening member in a direction away from the wall, the outer scoreline having a starter section, the starter sections of the inner and outer scorelines being located on opposite sides of the securing means, the remaining end of the opening member including rupturing means for rupturing by Class 1 lever action the starter section of the outer scoreline with movement of the non-bendable handle end of the longitudinally rigid opening member in a direction away from the wall.*

*25. The structure of claim 24 in which the tear-segment has opposite ends and a midsection and the opening member is secured to the midsection of the tear segment.*

*26. The structure of claim 24 in which the removable portion of the wall includes profiling means for increasing the strength of the removable portions.*

*27. The structure of claim 24 in which the rupturing means at the remaining end of the opening member is aligned with and contiguous the starter section of the outer scoreline.*

*28. The structure of claim 27 in which the scorelines are formed on an exterior surface of the container wall.*

*29. The structure of claim 24 in which at least a major portion of the starter section of the inner scoreline underlies the opening member, with the starter section of the inner scoreline being positioned to be ruptured upon movement of the handle end of the opening member away from the container wall and the starter section of the outer scoreline being positioned to be ruptured subsequent to rupture of the inner scoreline.*

*30. The structure of claim 29 in which the starter sections of the scorelines are positioned to be ruptured in rapid sequence.*

*31. The structure of claim 29 in which the starter section of the inner scoreline includes a pointed configuration underlying the opening member and projecting in a direction away from the securing means.*

*32. The structure of claim 24 in which the removable portion of the container wall constitutes a major portion of a wall of the container.*

*33. The structure of claim 32 in which the container wall is an end wall.*

*34. The structure of claim 24 including restraining means for restraining rotational movement of the opening member about the securing walls in a direction generally parallel to the container wall.*

*35. The structure of claim 24 in which movement of the rupturing means is in a direction toward the container wall with movement of the handle end of the opening member in a direction away from the wall.*

*36. The structure of claim 24 in which the securing means comprises a unitary rivet, the rivet being formed from material of the container wall.*

*37. The structure of claim 24 in which the container wall comprises sheet metal.*

*38. In an assembly including a panel having a removable portion, and a pull tab secured to said panel and restricted substantially against hinging relative to an adjacent portion of said panel; the improvement residing in a line of weakening formed in said panel removable portion immediately adjacent the connection between said pull tab and said panel for effecting the initial rupture of said panel upon the application of a panel rupturing force to said pull tab and the formation of hinge means in said panel with said hinge means including said connection and facilitating the hinging of said pull tab for effecting the further and separate rupture of said panel remote from said connection and the removal of said panel portion, and said pull tab being a longitudinally member which is not non-bendable during an opening sequence.*

*39. The assembly of claim 38 wherein said removable panel portion is defined by a second line of weakening formed separate and apart from the first-mentioned line of weakening.*

*40. The assembly of claim 38 wherein said line of weakening underlies said pull tab and additionally functions to form a vent opening upon the initial rupture of said panel.*

*41. The assembly of claim 38 wherein said line of weakening is generally U-shaped.*

*42. The assembly of claim 38 wherein said line of weakening is generally U-shaped and opens toward said connection.*

*43. The assembly of claim 38 wherein said line of weakening is generally U-shaped and has diverging end portions for preventing the accidental separate tearing out of said hinge means.*

*44. In a container end including an end panel defined by an upstanding chuck wall, a weakening line formed in said end panel and defining a removable panel portion, said weakening line including a starting portion disposed closedly adjacent said chuck wall, a pull tab having a nose for engaging said panel along said weakening line starting portion for effecting the rupture of said panel in the removal of said panel portion, and securing means securing said pull tab to said panel; the improvement comprising said securing means rigidly securing said pull tab to said panel portion and including hinge forming means in said removable panel portion for facilitating the hinging of said pull tab relative to said end panel to rupture said end panel along said weakening line starting portion, and said pull tab being a longitudinally rigid lever which is non-bendable during an opening sequence.*

*45. The container end of claim 44 wherein said hinge forming means includes a generally U-shaped weakening line opening towards said weakening line starting portion.*

*46. The container end of claim 44 wherein said hinge forming means includes a generally U-shaped weakening line opening towards said weakening line starting portion and having terminal ends directed away from said weakening line starting portion for preventing the accidental tearing out of a narrow portion only of said removable panel portion between said weakening lines.*

*47. The container end of claim 44 wherein said line of weakening includes a generally U-shaped central portion and diverging adjacent portions.*

*48. The assembly of claim 38 wherein said removable panel portion is defined by a second line of weakening formed separate and apart from the first-mentioned line of weakening, and said lines of weakening define an intermediate strap-like hinge strip.*

*49. The assembly of claim 48 wherein said pull tab is secured only to said hinge strip.*

*50. A container end including an end panel, a continuous primary weakening line in said end panel defining a*

*removable panel portion, a secondary weakening line in said removable panel portion separate and apart from said primary weakening line, a nose positioned adjacent said primary weakening line for effecting rupture of said primary weakening line, and a pull tab secured to said removable panel portion adjacent to said secondary weakening line and in alignment with said nose, and said nose and said pull tab forming a longitudinally rigid lever in which the nose is non-bendable relative to the pull tab for first stressing said removable panel portion to effect rupture thereof along said secondary weakening line and then effecting the movement of said nose to stress said end panel along said primary weakening line to rupture said end panel therealong.*

*51. The container end of claim 50 wherein said pull tab is permanently connected to said nose.*

*52. The container end of claim 50 wherein said nose is displaced from the connection between said pull tab and said removable panel portion.*

*53. The container end of claim 50 wherein said nose is a part of said pull tab.*

*54. In a container, the combination of:*

*a container wall of sheet material;*

*a first line of weakness in said container wall defining a tear strip manually removable therefrom;*

*a second line of weakness in said container wall adjacent said first line of weakness and defining a hinge, said hinge being spaced from said first line of weakness by a portion of said tear strip;*

*a longitudinally rigid lever type tab lying at least partially within the area of said tear strip, said tab having a handle end and a force applying end which is non-bendable in use relative to said handle end with the force applying end lying at a preselected location closely adjacent said first line of weakness; and*

*means integral with said tear strip for securing said tab to said tear strip, movement of said handle end of said tab urging said force applying end firmly against said container wall to cause hinged movement of said portion of said container wall about said hinge to initiate severance of the tear strip along said first line of weakness.*

*55. A combination as defined in claim 54 wherein said hinge lies within said tear strip and said tab extends across said hinge.*

*56. A combination as defined in claim 55 wherein said tear strip extends over a major portion of said container wall.*

*57. A combination as defined in claim 55 wherein said hinge lies intermediate said last mentioned means and said first line of weakness and said preselected location is on said tear strip.*

* * * * *